Oct. 19, 1965 I. TSU ETAL 3,212,918
ELECTROLESS PLATING PROCESS
Filed May 28, 1962
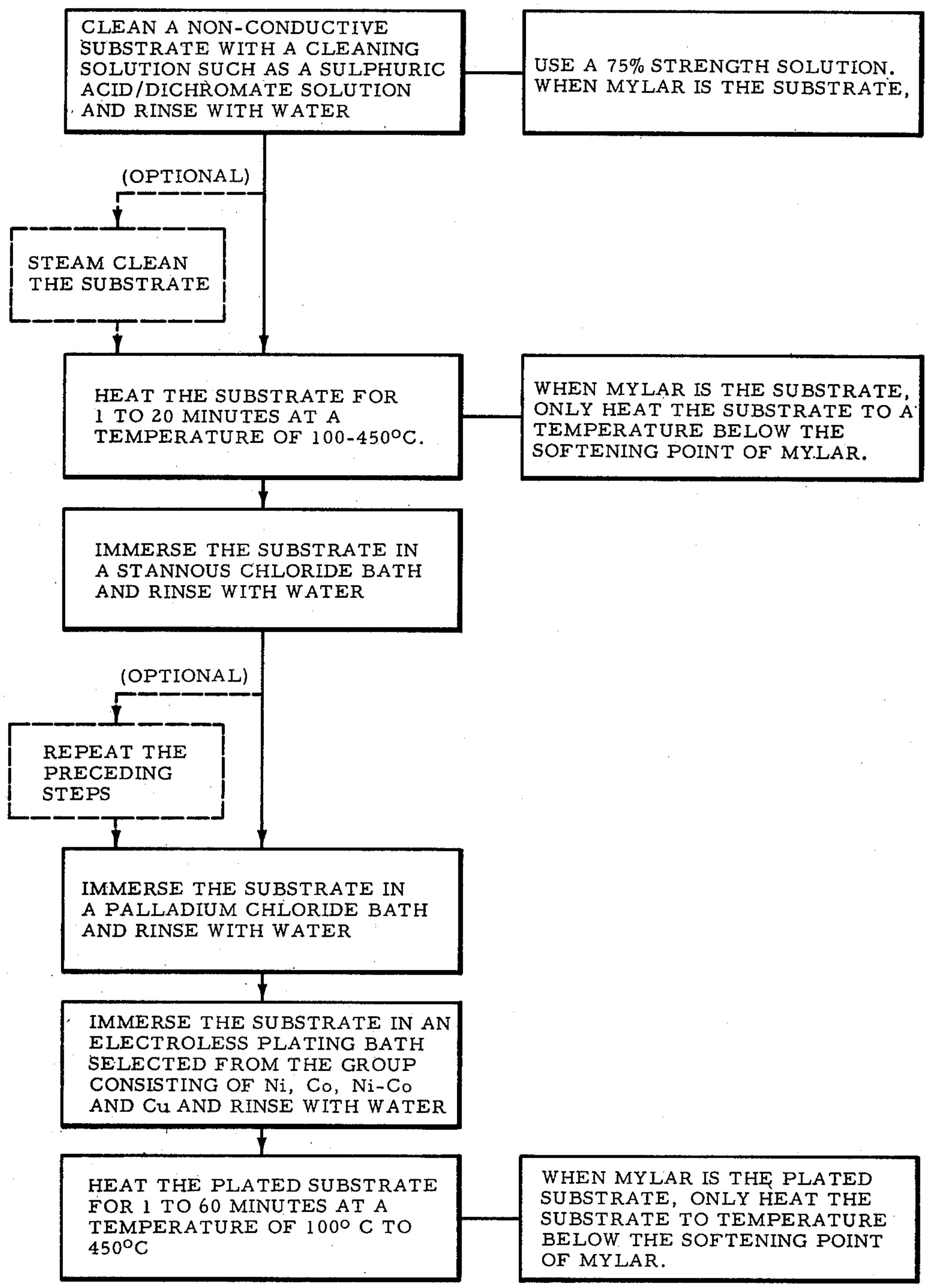
INVENTORS.
IGNATIUS TSU
RONALD G. STEVENS
By Edward W. Brown
ATTORNEY United States Patent Office 3,212,918
Patented Oct. 19, 1965

3,212,918

ELECTROLESS PLATING PROCESS

Ignatius Tsu, San Jose, Calif., and Ronald G. Stevens, Fishkill, N.Y., assignors to International Business Machines Corporation, New York, N.Y., a corporation of New York Filed May 28, 1962, Ser. No. 197,901
5 Claims. (Cl. 117—54)

This invention relates to a method for improving the deposition of conductors upon non-conductive substrates and more particularly to a method for fabricating spectral plated surfaces in an electroless fashion.

Spectral, reflective coatings have been deposited on ceramic surfaces, especially upon glass for mirrors, for many years. One widely used technique is the silver reduction or silver spraying technique for manufacturing reflectors. Using this technique involves the chemical reduction of silver from silver nitrate solution by a reducing agent.

Disadvantages associated with the above silver reduction technique, and other similar techniques for the manufacture of optically reflective surfaces, are manifold. One disadvantage is the high cost of the metal. Most often a costly metal, such as silver, is used and the high initial cost of the bath, as well as the abnormally expensive reclamation process to recover the "used" silver in the solution, is expensive in direct relation to the coating thickness needed. But for mechanical strength, one has had to avoid the thinner, less expensive coatings since they adhere poorly and are readily erodible. This poor adhesion constitutes a serious drawback in the prior plating art. Such poor adhesion is customarily due to presence of contaminants at the interface between substrate and plating. My invention remedies this by a "pre-sensitizing" treatment.

Metal sputtering and vacuum deposition techniques are often employed in industry to fabricate optically reflective surfaces. Due to the difficulty in operation and the high cost of equipment, they are not widely adopted for manufacturing front-surface mirrors. These mirrors are precision fabricated, being vital for many close-tolerance optical measurements. Electroless plating would be advantageous for making them except for adherence difficulties. These difficulties are obviated by using my invention.

The adherence problem is compounded many times when one plates metal to plastic film substrates, such as Mylar tape. Such a plating is of high interest presently in the data processing field where Mylar tape is commonly coated with a magnetic metal film, such as nickel or nickel-cobalt, for magnetic recording purposes. With such a flexible substrate it is easy to visualize the difficulty in preventing a superposed thin metal film, which is already relatively brittle, from cracking and peeling, especially under the action of humidity and mechanical stress. This invention answers this problem by utilizing a pre-sensitizing, outgassing treatment of the substrate, so as to enhance sensitizer action and minimize surface contaminants.

Such highly spectral surfaces are becoming increasingly important in data processing where, for higher bit density readout, magnetic disks are provided with such surfaces, allowing magneto-optic (Kerr or Faraday) readout. In this context, the fragility of conventional, poorly-adhering, reflective films is most undesirable since the disks must be rugged enough to stand up under handling, head-bounce, etc., and constitute a permanent record. For such a purpose, the high adhesion affected by the instant process is vital.

The outgassing treatment of this invention is of further interest in that it accelerates post-sensitizer plating action, in many cases doubling the rate of deposition. This is of high interest in the volume-plating applications, such as the coating of magnetic tape noted above, as it can of itself increase production rates.

In order to overcome the above-mentioned adhesion problem for a non-conductive substrate such as glass or Mylar, I have found that substrate sensitizing is very important. A nickel film, for instance, will not deposit upon glass which has a smooth, highly polished surface unless the glass has been properly sensitized. Moreover, the adherence properties deteriorate as the time of plating immersion increases, but this deterioration is minimized by the present invention since plating action is accelerated (therefore, plating time decreased) by my pre-sensitizing outgassing. Hence, adhesion is in turn improved by such a pre-sensitizing step. A further problem arises as a result of cleansing. One must typically cleanse a substrate surface before sensitizing. One typical way of cleaning the substrate is with a laboratory cleansing solution. However, the cleansing solution (commonly sulfuric acid and dichromate) will leave a film upon the substrate surface which resists repeated water rinsings, but this tenacious residue of cleaning solution is detrimental to the sensitizing action and consequently interferes with plating. One feature of my inventive process is to remove this detrimental residue.

Consequently, it is important to optimize sensitizer action for good adherence and fast plating. For this, one must enhance sensitizer action by a preliminary heating process according to my invention; and such a process has the added advantage of removing deleterious contaminants.

In accomplishing this, my invention allows the employment of inexpensive electroless plating baths which, for the first time, provide strongly adherent metal deposits on non-conductive substrates. The degree of adhesion I have achieved with my electrolessly deposited metal films on smooth and highly polished non-conductive surface approaches 2,000 pounds per square inch, an adhesion heretofore unattainable.

The art further shows that glass can be sensitized so that metals such Os, Ir, Pt, Pd, Ni, Cr and Mn are more readily plated thereon, but the platings formed when Cu and Pd are utilized do not have sufficiently good adhesion to the glass substrate to be used for many purposes. My pre-sensitizing bake process will cure this.

As further advantatges over the prior art, my process for improving platability by pre-sensitizing outgassing techniques makes it unnecessary to abrade the substrate as has been required in prior art processes for this purpose. Such abrasion is tedious, expensive and changes surface characteristics.

Therefore, it is an object of the present invention to provide an improved process for giving good adhesion between non-metallic substrates and metals plated thereon.

Another object is to pre-sensitize substrates for decreased plating time according to a novel heat treatment.

A further object is to outgas a smooth substrate containing moisture and microscopic impurities in its pores so as to adhere a metallic film plated thereon.

Another object is to heat-treat a non-metallic smooth substrate on which a metal is to be plated prior to the plating process to improve the plating rate and adhesion to the substrate.

Yet another object is to outgas a smooth non-metallic substrate and remove microscopic contaminants by evacuation of the substrate to a degree depending upon the porosity and the density of said substrate.

The foregoing and other objects, features and advantages of the invention will be apparent from the following more particular description of preferred embodiments of the invention as illustrated in the accompanying drawing.

The single figure is a flow chart outlining the steps of the preferred process of the invention.

In order to aid those skilled in the art of electrolytic plating to use the present invention for plating metallic coatings on a non-metallic substrate, the following details of typical plating procedures will now be described, prescribing suitable presensitizing treatments according to the invention. Examples of suitable bath constituents and of processing parameters are summarized in the tables below, each table given for a particular plating solution and are described in the accompanying description.

TABLE I

*Nickel bath*

| | |
|---|---|
| $N_1'Cl_2 \cdot 6H_2O$ | 30 g./l. |
| $NaH_2PO_2 \cdot H_2O$ | 10 g./l. |
| $NH_4Cl$ | 50 g./l. |
| $Na_3C_6H_5O_7 \cdot 2H_2O$ | 100 g./l. |

pH ($NH_4OH$)=7–9.
Temperature=88–98° C.

PLATING PROCEDURE (1) Cleansing steps:
 (1) $H_2SO_4$+Dichromate then water rinse.
 (2) Steam clean (remove water)—may be omitted if water rinsed thoroughly.
(2) Pre-heating treating:
 Time: 1–20 minutes depends on substrate condition.
 Temperature: 100°–450° C. depends on type of substrate.
(3) Sensitizer steps:
 (1) Stannous chloride solution.
 (2) Water rinse.
 (3) $PCl_2 \cdot 2H_2O$ solution.
 (4) Water rinse (for all non-conducting substrates except glass and pyroceram).
(4) Plating: Agitation helps uniformity.
(5) Post-treatment:
 (1) Water rinse follows plating to help adhesion.
 (2) Heat treat—to remove moisture.

Time: 1–60 minutes depends on type of substrate.
Temperature: 100°–450° C. depends on type of substrate.

The plating bath constituents and their ranges, as well as the pre-treating and post-treating steps, which have been capsulized above in the Table I (for plating nickel), will now be described in more detail. The initial step is pre-cleansing of the substrate. This step is basic. Nickel film will not deposit on a smooth, highly polished, non-conducting substrate surface unless that surface is clean and free of all contaminants. The difficulty in removing the contaminants, I have observed, varies according to the density and porosity characteristics of the substrate. Pyroceram and glass were used as the substrates. However, if one uses Mylar as a substrate, 75% strength of cleaning solution should be applied for ten seconds.

Laboratory cleaning solution (sulfuric acid and dichromate) will serve as the first cleansing agent, to be followed by water rinsing. However, the solution always leaves a thin film residue on the surface despite repeated water rinsings. This is detrimental to the sensitizer action and consequently, is deleterious to nickel deposition, impeding the deposition rate, and interfering with adhesion. In case the cleansing solution is used and followed by the usual water rinsings, I have found that steam cleaning should be employed, thereafter, to remove the cleaning solution residue and the moisture remaining after the rinse; however, steam cleaning is unnecessary where rinsing is adequate.

An alternative and convenient way to cleanse the substrate is with a warm soapy water or laboratory detergent solution. This should be followed by rinsing with de-ionized water, then the substrate should be soaked in hot boiling water (de-ionized also) for approximately ten minutes. The glass surface is not clean if water-break (droplets left when water is poured over the substrate) forms. In such a case the cleaning procedure should be repeated. Steam cleaning may be substituted for the boiling water soak. As a follow-up step to remove any remaining moisture, the substrate may be sprayed with a jet air stream.

The next step is sensitizer preparation with a heat treatment. For this, the substrate is placed in an oven (a heat-gun may be substituted for convenience) to bake out the contaminants residing in the pores and pre-heat to optimize the sensitizing action. Due to differences in substrate densities and porosities (cf. nucleation effect or "islands" in the plated film), I have found that the moisture content will vary. This observation that the heat treatment of the substrate is a function as to time and degree, of the density and porosity of the substrate, is an important consideration. One significant consequence of it is that the baking temperature and baking time required to outgas ceramics (glass here) will depend upon their porosity and density parameters. Such high baking temperatures are desirable and longer baking times are not usually harmful, it has been found that a satisfactory rule of thumb is to bake at 140° C. for twenty minutes for most substrates. This is a rule of convenience and may be optimized and refined within limits. Mylar tape substrates, for example, are best baked at about 120° C. for fifteen minutes.

An alternative method to this thermal decontamination, is outgassing by evacuation. According to this concept, the substrate is placed in a suitable evacuation chamber such as a bell jar and the chamber pumped down to a high vacuum for about 5 to 10 minutes depending, of course, upon the porosity and density of the substrate. One may optimize this evacuation procedure by simultaneously heating the substrates during evacuation. Evacuation should be followed by, or include, sufficient heating to prepare the substrate for optimum sensitizing; however, if one outgasses by evacuation he should also heat-treat the substrate to improve the subsequent sensitizing action, as seen above.

The next step in treating the substrate before plating is that of sensitizing. Two sensitizing steps are used for complete sensitizing. The first sensitizer used is stannous chloride: $SnCl_2 \cdot 2H_2O$ at 30 g./l. and HCl (concentrated) at 10 ml./l. Normally, a fast dip in this sensitizer will be sufficient. However, in order to insure proper sensitizing action throughout the surface area, agitation should be used. Sensitizing action is optimized if the glass is still hot, from the baking step above, when it is dipped into the sensitizer solution; however, the substrate should not be too hot as it may crack due to thermal shock.

This sensitizing dip is followed by a thorough water rinse. It is imperative to remove all of the sensitizer on the substrate surface because stannous chloride will reduce palladium ions to form metallic Pd and thus undercut the purpose for using the second ($PdCl_2$) sensitizer. Following this thorough water rinse, the substrate is inserted in the second sensitizer solution consisting of:

$$PdCl_2 \cdot 2H_2O$$

at 0.02–0.1 g./l. and HCl (concentrated) at 10 ml./l. Again, a quick dip in this second sensitizer will be sufficient and some agitation should be employed. A second baking, between sensitizer steps may be added to optimize the second sensitizing. For all other non-conducting substrates, particularly Mylar, rinsing to remove palladium chloride residue is imperative.

The next step is the plating operation. The substrate is taken from the $PdCl_2$ sensitizer dip to be inserted into the electroless nickel plating bath. The constituents of this bath and their ranges are described in Table I above. Tables II through V below describe alternative baths. While being plated, it is important that the bath solution be agitated to insure uniform nickel deposition. The rate of nickel deposition (a bright reflective nickel surface is desired in this example) is approximately 10 A° per second, without any substantial pre-sensitizer action, but upon application of the above pre-sensitization method, the deposition rate doubles, increasing to 20 A° per second.

Alternative substrates suitable for the above spectral metal coating may very widely. If one chooses a non-metallic substrate he may conveniently use materials such as ceramics, glass, pyroceram, nylon, plastics, lucite, Mylar or acetate film. As noted above, I have found that glass and pyroceram are particularly suited for this reflective nickel coating and as noted before, the pre-sensitizing treatment may be optimized accordingly as one knows the porosity and densities of the substrate. In making a mirror, 4 to 5 seconds of deposition is sufficient. Coating thickness requirements for optical applications ordinarily are in the four micro-inch order of magnitude. After the plating operation is completed and the plated substrate is removed, it should be immediately water rinsed and thoroughly dried using a jet air stream.

I have found that a post-plating outgassing is necessary after the plating operation (as well as before) to assure good adhesion at the deposited metal-substrate interface. The effect seems to be to remove the latent moisture in the metallic film deposited and in the interface between that deposition and the substrate (cf. film nucleation effect).

This moisture results from leakage of the moisture contents of the bath into and under the "islands" of metal deposited. These islands are a normal characteristic of thin plated films since the deposition mechanism is one of "nucleation" of metal deposits, rather than a uniform, continuous coat. Such inter-nucleation leakage is an immersion time-dependent phenomena and seems to be harmless until after 2 or 3 seconds immersion. Hence, since the deposition rate is virtually doubled by the pre-sensitizer baking of my invention, then, immersion time, for a given plating thickness may be shortened, minimizing any resultant inter-nucleation leakage and poor adhesion. The above prebaking assists in preventing such leakage. As a remedy for whatever leakage is not prevented by the prebaking, I advise a post-baking treatment (after the plating operation), to drive out any inter-nucleation deposits. This is another aid toward optimum adhesion because moisture at the interface is the great enemy of film adhesion. The outgassing procedures used (above) *before* plating are suitable here after the plating operation, such as the heat-treating and evacuation treatments noted before. One practical way to accomplish this is the rule of thumb baking procedure noted above, namely 20 minutes baking at 140° C. for most glass substrates. Of course, this may be optimized for particular glass densities and porosities. As a maximum, it is found that temperatures as high as 450° C. for glass or pyroceram may be used. If one chooses to substitute an evacuation treatment, I have found that, for most glasses, about 5 to 10 minutes at a high vacuum and at room temperature is suitable.

If one chooses Mylar tape as a substrate, I have found it advantageous to vary the above treatment somewhat. Therefore, I have determined that the following steps are advisable in order to electrolessly deposit an adherent metal thin film on Mylar:

(1) Clean Mylar in 75% strength laboratory cleaning solution (Mylar will be attacked by full strength cleaning solution).

(2) Water rinse.

(3) Pre-sensitizing baking—100° to 120° C. for 5 to 15 minutes.

(4) Stannous chloride sensitizer dip.

(5) Water rinse (repeat steps 1 to 4, if necessary).

(6) Palladium chloride sensitizer dip.

(7) Water rinse.

(8) Electroless plating.

(9) Water rinse.

(10) Jet air dry.

(11) Post-sensitizing baking—100° to 120° C. for minimum of 5 minutes (length of time is not critical).

To insure the complete removal of cleaning solution residue, after step 2 the Mylar may be dipped in hot diluted caustic solution (NaOH or KOH) and followed by water rinse. Hot laboratory detergent may be used to clean Mylar. However, for quick cleansing action, a quick dip in cleaning solution (5 to 10 seconds) is recommended. The resulting plated Mylar tape has a plating-to-substrate adhesion that exceeds anything heretofore produced. This makes it especially attractive as a magnetic medium in the data processing field where the flexibility of the substrate and the rough mechanical handling of the tape is a constant challenge to thin film adhesion.

As before noted, the above pre-sensitizing and outgassing process may be applied in many diverse plating applications—virtually wherever a conductive material is deposited on a non-conductor. As examples of such alternative applications, the following electroless plating baths are listed. Any convenient non-conducting substrate may be used, within the limits of the plating procedure outlined above, with a fine adjustment being made for particular materials.

TABLE II

*Nickel bath*

| | |
|---|---|
| $NiSO_4 \cdot 6H_2O$ | 15–20 g./l. |
| $NaH_2PO_2 \cdot H_2O$ | 10–20 g./l. |
| $NH_2CH_2COOH$ | 10–20 g./l. |

pH(NaOH)=4.9.
Temperature=88–98° C.

TABLE III

*Cobalt bath*

| | |
|---|---|
| $CoCl_2 \cdot 6H_2O$ | 30 g./l. |
| $NaH_2PO_2 \cdot H_2O$ | 15–20 g./l. |
| $Na_3C_6H_5O_7 \cdot 2H_2O$ | 40–70 g./l. |

$pH(NH_4OH)$=7–9.
Temperature=88–98° C.

TABLE IV

*Cobalt-nickel bath*

| | |
|---|---|
| $CoCl_2 \cdot 6H_2O$ | 2–30 g./l. |
| $NiCl_2 \cdot 6H_2O$ | 30–2 g./l. |
| $NaH_2PO_2 \cdot H_2O$ | 10–20 g./l. |
| $Na_3C_6H_5O_7 \cdot 2H_2O$ | 40–80 g./l. |

$pH(NH_4OH)$=7–9.
Temperature=88–98° C.

TABLE V

*Copper bath*

| | |
|---|---|
| $CuSO_4 \cdot 5H_2O$ | 8 g./l. |
| $KNaC_4H_4O_6 \cdot 4H_2O$ | 90 g./l. |
| HCOH(37%) | 10 ml./l. |

pH(NaOH)=12–12.7.
Temperature=room temperature.

For silver plating, the step of palladium chloride sensitizer is eliminated. After stannous chloride dip (or spray stannous chloride solution onto substrate) and water rinse, the substrate is now ready for silvering. In order to obtain an adherent front-surface silver mirror, it is imperative to deposit a very thin silver metal film. Also, the water rinsing after plating should not be prolonged. The silver plating bath is conventional and usually contains silver nitrate and a reducing agent.

Other processes wherein the instant method for improving adhesion between metallic coatings and a substrate can be advantageously employed, would be for making an insulative surface conductive so as to electroplate to it (analogous to Mylar for magnetic tape noted above) or for depositing a reflective metal (e.g., Cu, Ni, Co, Ag) onto a crystal for X-ray studies. Other applications obvious to those skilled in the art will be apparent and the invention should not be considered as confined to the few embodiments described above.

While the invention has been particularly shown and described with reference to the preferred embodiments thereof, it will be understood by those skilled in the art that various changes in form and details in constituents and steps in concentrations and ranges may be made without departing from the spirit and scope of the invention.

What I claim is:

1. A method of electrolessly depositing a conductive film upon a non-conductive substrate which comprises the steps of:

(a) cleaning and rinsing said substrate;

(b) heating said substrate at from 100° to 450° C. for from 1 to 20 minutes so as to improve sensitizing action and thereby increase the deposition rate;

(c) sensitizing the substrate by first immersing in a stannous chloride bath, then rinsing, next immersing in a palladium chloride bath, followed by rinsing;

(d) electrolessly depositing said conductive film on the thus sensitized substrate by immersing in an electroless plating bath selected from the group consisting of Ni, Co, Ni-Co and Cu electroless plating baths, then rinsing;

(e) heating the thus plated substrate at from 100° to 450° C. for from 1 to 60 minutes so as to remove all contaminants in and between said substrate and said conductive coating.

2. The method according to claim 1 wherein said substrate is glass and the preplating heating thereof in step (b) is at 140° C. for 20 minutes.

3. The method according to claim 1 wherein the preplating heating in step (b) is done simultaneously with a vacuum evacuation of the substrate for outgassing.

4. The method according to claim 1 wherein said heating steps (b) and (e) are performed in a highly evacuated chamber to assist in the outgassing of said substrate.

5. The method according to claim 1 wherein the post plating heating of step (e) is done simultaneously with a vacuum evacuation of the thus plated substrate for outgassing.

References Cited by the Examiner

UNITED STATES PATENTS

| | | | |
|---|---|---|---|
| 97,838 | 12/69 | Walker | 117—35 |
| 1,584,728 | 5/26 | Case | 117—61 X |
| 2,383,470 | 8/45 | Morgan | 117—54 |
| 2,439,654 | 4/48 | Gaiser et al. | 117—35 |
| 2,562,182 | 7/51 | Godley | 117—61 X |
| 2,757,104 | 7/56 | Howes | 117—54 X |

RICHARD D. NEVIUS, *Primary Examiner.*

WILLIAM D. MARTIN, *Examiner.*